(12) United States Patent
Okamura et al.

(10) Patent No.: US 8,226,208 B2
(45) Date of Patent: Jul. 24, 2012

(54) NON-WETTING COATING ON A FLUID EJECTOR

(75) Inventors: Yoshimasa Okamura, San Jose, CA (US); Jeffrey Birkmeyer, San Jose, CA (US); John A. Higginson, Santa Clara, CA (US); Gregory De Brabander, San Jose, CA (US); Paul A. Hoisington, Hanover, NH (US); Andreas Bibl, Los Altos, CA (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 0 days.

(21) Appl. No.: 13/106,737

(22) Filed: May 12, 2011

(65) Prior Publication Data

US 2011/0212261 A1 Sep. 1, 2011

Related U.S. Application Data

(63) Continuation of application No. 11/479,152, filed on Jun. 30, 2006.

(60) Provisional application No. 60/696,035, filed on Jul. 1, 2005.

(51) Int. Cl.
*B41J 2/135* (2006.01)
(52) U.S. Cl. .......................................... 347/45; 347/47
(58) Field of Classification Search .................. 347/40, 347/42, 45–47, 49
See application file for complete search history.

(56) References Cited

U.S. PATENT DOCUMENTS

| | | | |
|---|---|---|---|
| 5,121,134 A | 6/1992 | Albinson et al. | |
| 5,595,785 A | 1/1997 | Hindagolla et al. | |
| 5,606,352 A | 2/1997 | Yamakawa et al. | |
| 5,781,213 A | 7/1998 | Ujita et al. | |
| 5,910,372 A | 6/1999 | Griffin et al. | |
| 5,959,643 A | 9/1999 | Temple et al. | |
| 6,283,578 B1 | 9/2001 | Popall et al. | |
| 6,312,103 B1 | 11/2001 | Haluzak | |
| 6,325,490 B1 | 12/2001 | Yang et al. | |

(Continued)

FOREIGN PATENT DOCUMENTS

EP 1157842 11/2001
(Continued)

OTHER PUBLICATIONS

Ashurst, et al., "Dichlorodimethylsilane as an Anti-Stiction Monolayer for MEMS: A Comparison to the Octadecyltrichlosilane Self-Assembled Monolayer", Journal of Microelectromechanical Systems, vol. 10, No. 1, Mar. 2001, pp. 41-49.

(Continued)

*Primary Examiner* — Thinh Nguyen
(74) *Attorney, Agent, or Firm* — Fish & Richardson P.C.

(57) ABSTRACT

A fluid ejector having an inner surface, an outer surface, and an orifice that allows fluid in contact with the inner surface to be ejected. The fluid ejector has a non-wetting monolayer covering at least a portion of the outer surface of the fluid ejector and surrounding an orifice in the fluid ejector. Fabrication of the non-wetting monolayer can include removing a non-wetting monolayer from a second region of a fluid ejector while leaving the non-wetting monolayer on a first region surrounding an orifice in the fluid ejector, or protecting a second region of a fluid ejector from having a non-wetting monolayer formed thereon, wherein the second region does not include a first region surrounding the orifice in the fluid ejector.

17 Claims, 4 Drawing Sheets

U.S. PATENT DOCUMENTS

| | | |
|---|---|---|
| 6,364,456 B1 | 4/2002 | Yang et al. |
| 6,416,159 B1 | 7/2002 | Floyd et al. |
| 6,428,142 B1 | 8/2002 | Silverbrook et al. |
| 6,472,332 B1 | 10/2002 | Gooray |
| 6,488,357 B2 | 12/2002 | Skinner et al. |
| 6,561,624 B1 | 5/2003 | Kikugawa et al. |
| 6,629,754 B1 | 10/2003 | Fukushima et al. |
| 6,676,244 B2 | 1/2004 | Kwon et al. |
| 6,827,973 B2 | 12/2004 | Nagashima |
| 6,938,986 B2 | 9/2005 | Macler et al. |
| 7,104,632 B2 | 9/2006 | Song et al. |
| 7,347,532 B2 | 3/2008 | Chen et al. |
| 7,622,048 B2 | 11/2009 | Birkmeyer et al. |
| 7,866,793 B2 * | 1/2011 | Silverbrook et al. ............ 347/45 |
| 2003/0030697 A1 | 2/2003 | Kwon et al. |
| 2003/0042545 A1 | 3/2003 | Voutsas et al. |
| 2003/0197758 A1 | 10/2003 | Sasaki et al. |
| 2004/0002225 A1 | 1/2004 | Wong et al. |
| 2004/0125169 A1 | 7/2004 | Nakagawa et al. |
| 2005/0046663 A1 | 3/2005 | Silverbrook |
| 2006/0057851 A1 | 3/2006 | Wong et al. |
| 2008/0136866 A1 | 6/2008 | Okamura et al. |
| 2008/0150998 A1 | 6/2008 | Okamura |
| 2011/0063369 A1 | 3/2011 | Okamura |

FOREIGN PATENT DOCUMENTS

| | | |
|---|---|---|
| EP | 1375154 A2 | 1/2004 |
| EP | 1568500 A1 | 8/2005 |
| JP | 1997085956 | 3/1997 |
| JP | 10235858 | 9/1998 |
| JP | 2001-199066 | 7/2001 |
| WO | 03013863 A1 | 2/2003 |
| WO | 2005007411 | 1/2005 |
| WO | 2005007413 | 1/2005 |
| WO | 2005037558 | 4/2005 |
| WO | 2007/005857 | 1/2007 |
| WO | 2010/051272 | 5/2010 |

OTHER PUBLICATIONS

Applied MicroStructures, Inc., "Common Precursors Used in MEMS", 2004, pp. 1-2.

Kobrin, et al., "Molecular Vapor Deposition—An Improved Vapor-Phase Deposition Technique of Molecular Coatings for MEMS Devices", SEMI® Technical Symposium: Innovations in Semiconductor Manufacturing, Semicon West 2004, pp. 1-4.

Written Opinion of the International Searching Authority, International Application Serial No. PCT/US2006/026023, Oct. 31, 2006, 13 pages.

Notice of the First Office Action, dated Jun. 26, 2009, Chinese Patent Office (office action for Chinese Application No. 200680032275.7).

Second Office Action dated Jun. 11, 2010, Chinese Patent Office (Chinese Application No. 2006800322751, 4 pages).

Communication pursuant to Article 94(3) EPC dated Jan. 27, 2010, European Patent Office (European Patent Application No. 06786241.7, 4 pages).

Office Action dated Feb. 15, 2011, issued in European Application No. 06786241.7, 5 pages.

Bunker et al., "The Impact of Solution Agglomeration on the Deposition of Self-Assembled Monolayers," Sandia National Laboratories, Received Apr. 4, 2000, Published on the Web Aug. 26, 2000, pp. 7742-7751.

Communication pursuant to Article 94(3) EPC dated Oct. 21, 2008, European Application No. 06786241.7, 10 pgs.

Authorized Officer Blaine R. Copenheaver, International Search Report and Written Opinion, mailed May 15, 2008, International Application Serial No. PCT/US2007/086165, 11 pgs.

Authorized Officer Lee W. Young, International Search Report and Written Opinion, mailed Jan. 4, 2010, International Application Serial No. PCT/US2009/062194, 11 pgs.

EPO Search Report issued Dec. 28, 2010 in European application No. 07865036.3.

EPO Communication pursuant to Article 94(3) EPC issued Nov. 1, 2011 in European application No. 07865036.3.

JP Office Action, Notice of Reasons for Rejection issued Mar. 26, 2012 in Japanese application No. 2008-519700, 11 pages.

Ashurst, et al., "Vapor Phase Anti-Stiction Coatings for MEMS", IEEE Transactions on Device and Materials Reliability, vol. 3, No. 4, Dec. 2003, pp. 173-178.

* cited by examiner

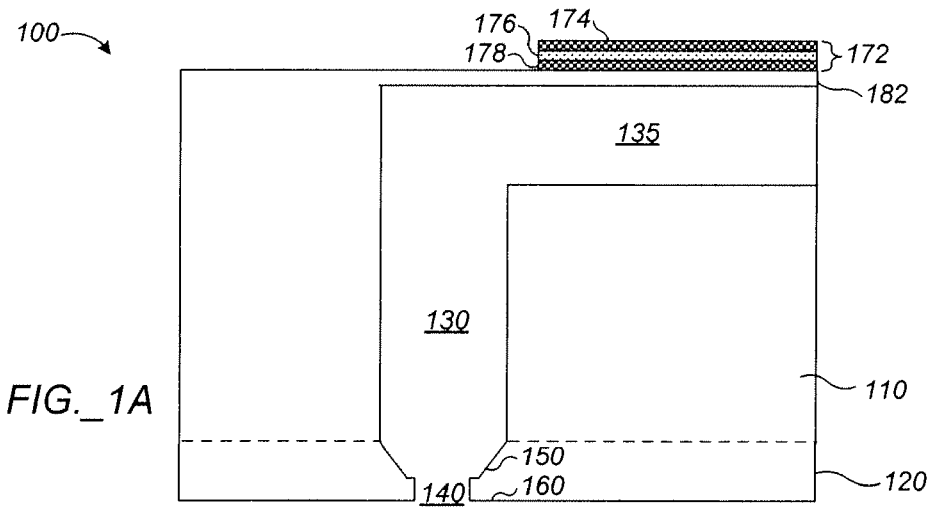
FIG._1A
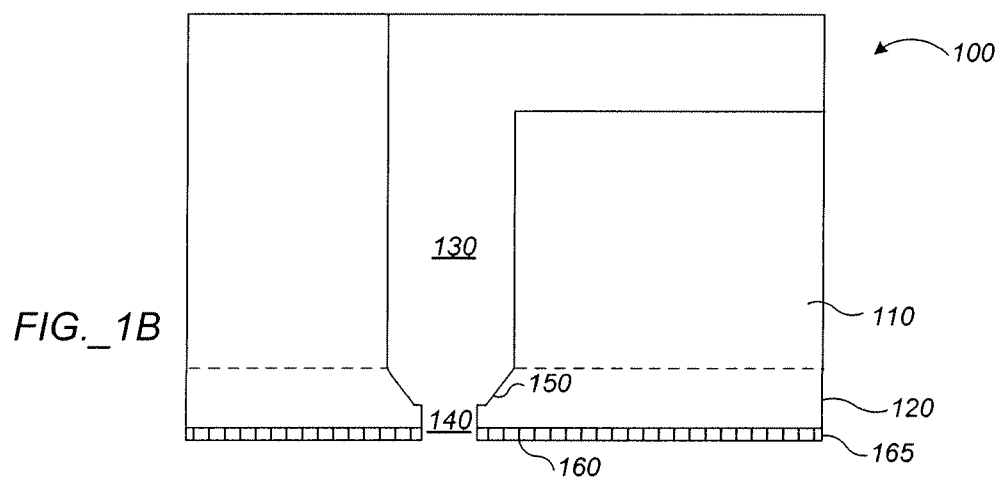
FIG._1B
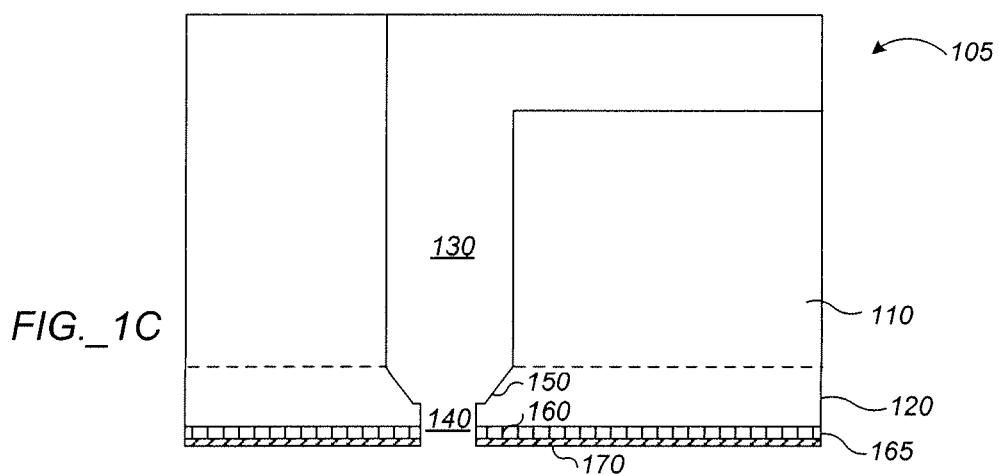
FIG._1C

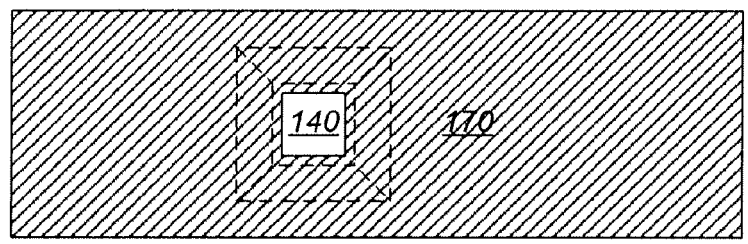
FIG._2
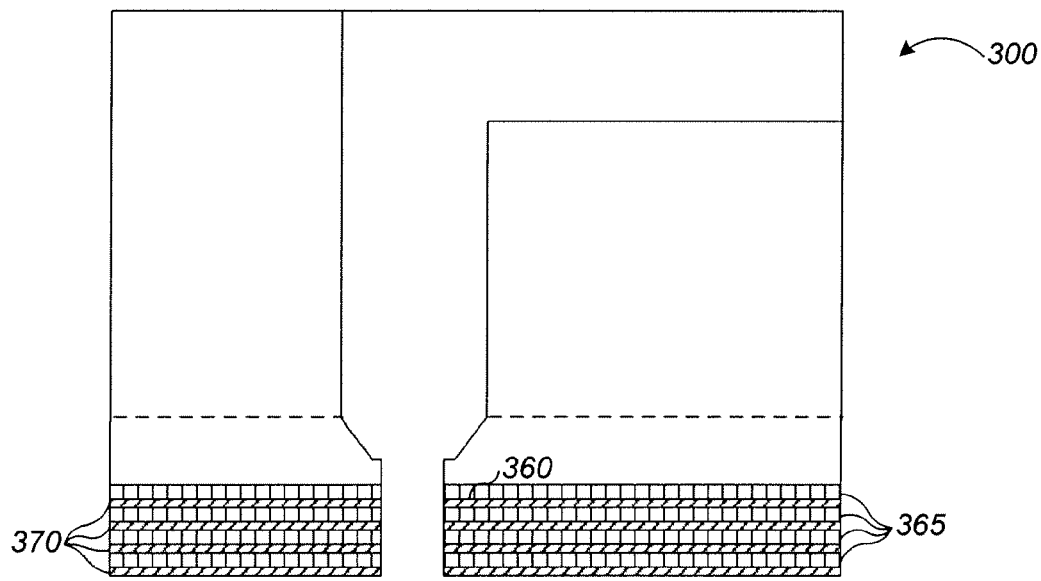
FIG._3
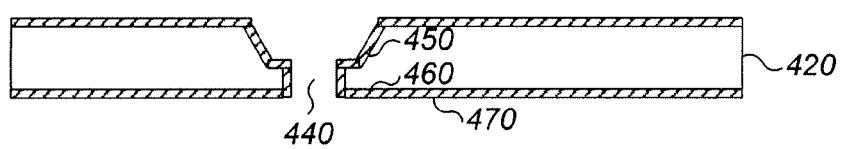
FIG._4
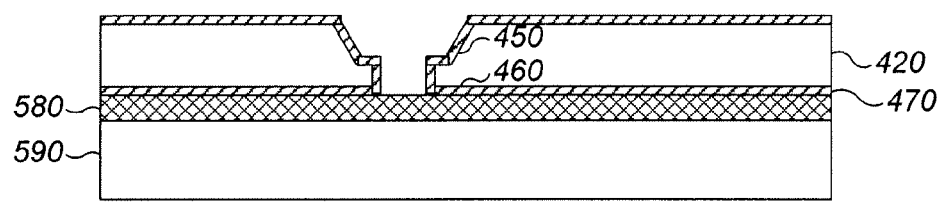
FIG._5

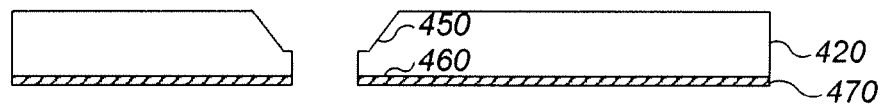
FIG._6
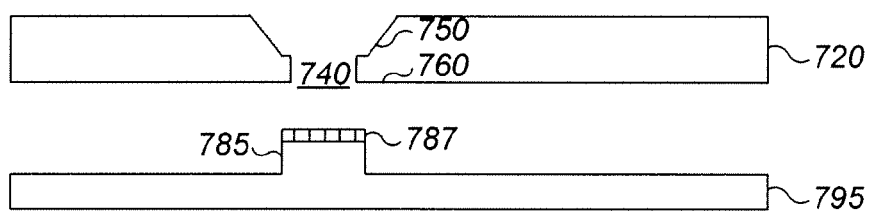
FIG._7A
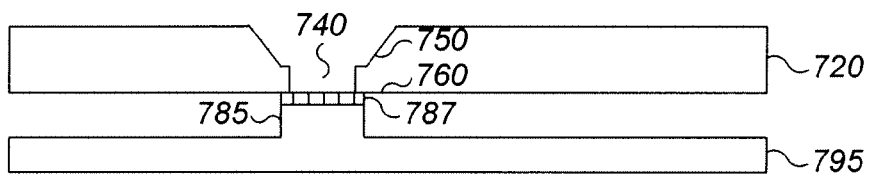
FIG._7B
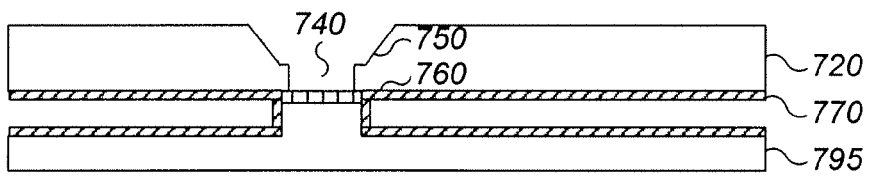
FIG._7C
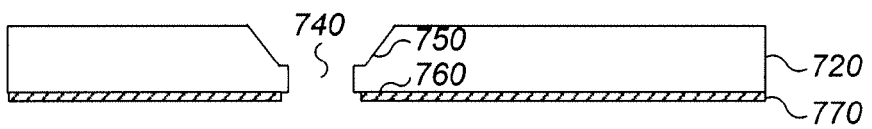
FIG._7D

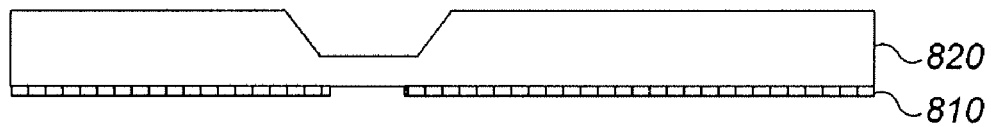
FIG._8A
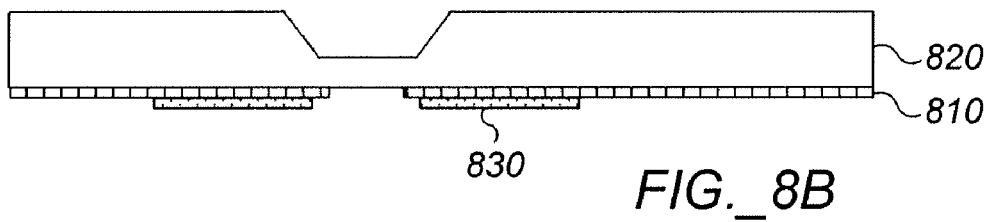
FIG._8B
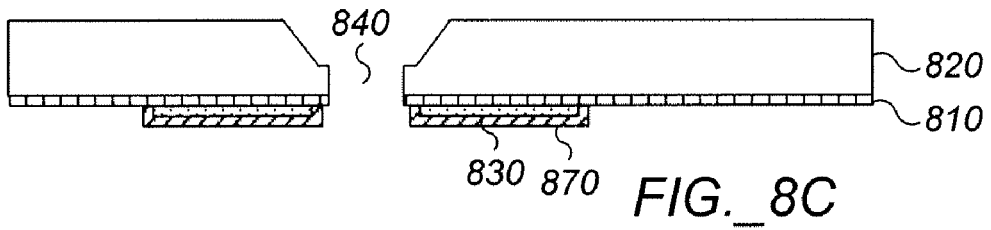
FIG._8C
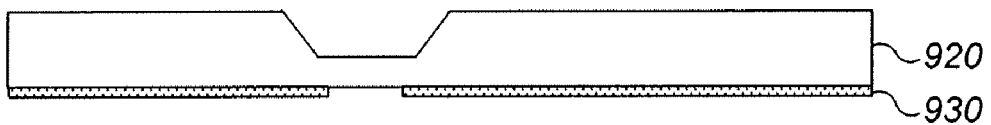
FIG._9A
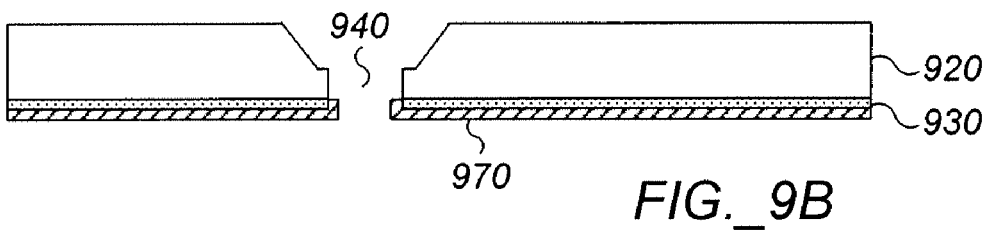
FIG._9B

னான்-WETTING COATING ON A FLUID EJECTOR

CLAIM OF PRIORITY

This application is a continuation of U.S. application Ser. No. 11/479,152, filed Jun. 30, 2006, which also claims the benefit of U.S. Provisional Application No. 60/696,035, filed Jul. 1, 2005, the contents of both are hereby incorporated by reference.

BACKGROUND

This invention relates to coatings on fluid ejectors.

A fluid ejector (e.g., an ink-jet printhead) typically has an interior surface, an orifice through which fluid is ejected, and an exterior surface. When fluid is ejected from the orifice, the fluid can accumulate on the exterior surface of the fluid ejector. When fluid accumulates on the exterior surface adjacent to the orifice, further fluid ejected from the orifice can be diverted from an intended path of travel or blocked entirely by interaction with the accumulated fluid (e.g., due to surface tension). Some materials from which fluid ejectors are fabricated (e.g., silicon) are hydrophilic, which typically exacerbates the problem of accumulation when fluids are ejected.

Non-wetting coatings such as Teflon® and fluorocarbon polymers can be used to coat surfaces. However, Teflon® and fluorocarbon polymers typically are soft and are not durable coatings. These coatings also can be expensive and difficult to pattern.

SUMMARY

In one aspect, the invention is directed to a fluid ejector having an inner surface, an outer surface, and an orifice that allows fluid in contact with the inner surface to be ejected. The fluid ejector has a non-wetting monolayer covering at least a portion of an outer surface of a fluid ejector and surrounding an orifice in the fluid ejector.

Implementations of the invention may include one or more of the following features. The non-wetting monolayer may include molecules which include at least one atom of each of carbon and fluorine. The non-wetting monolayer may not cover any portion of an inner surface of the fluid ejector.

In another aspect, the invention features a method for forming a non-wetting monolayer on a selected portion a fluid ejector. A non-wetting monolayer is removed from a second region of a fluid ejector while leaving the non-wetting monolayer on a first region surrounding an orifice in the fluid ejector.

In another aspect, a non-wetting monolayer is formed on a first region and a second region of a fluid ejector, where the first region surrounds an orifice in the fluid ejector. The non-wetting monolayer is removed from the second region while leaving the non-wetting monolayer on the first region.

Particular implementations may include one or more of the following features. The first region may be protected prior to removing the non-wetting monolayer from the second region. Protecting may include applying at least one of tape, photoresist, or wax to the first region prior to removing the non-wetting monolayer from the second region and removing the at least one of tape, photoresist, or wax after removing the non-wetting monolayer. Removing the non-wetting monolayer from the second region may include at least one of applying a plasma to the second region, laser ablating the second region, or applying ultraviolet light to the second region. The first region may include an outer surface of the fluid ejector and the second region may include an inner surface of the fluid ejector.

In yet another aspect, the invention features a method for forming a non-wetting monolayer on a selected portion of a fluid ejector. A second region of a fluid ejector is protected and a non-wetting monolayer is formed on a first region of the fluid ejector, where the first region surrounds an orifice in the fluid ejector.

In yet another aspect, a second region of a fluid ejector is protected from having a non-wetting monolayer formed thereon, wherein the second region does not include a first region surrounding an orifice in the fluid ejector.

Particular implementations may include one or more of the following features. The second region may include an interior of the orifice. Protecting the second region may include bonding a silicon substrate to the fluid ejector. Protecting the second region may include applying at least one of tape, photoresist, or wax to the fluid ejector prior to forming the non-wetting monolayer and removing the at least one of tape, photoresist, or wax after forming the non-wetting monolayer.

In still another aspect, the invention features a method for forming a non-wetting monolayer on a selected portion of a fluid ejector. An attachment region is formed on a fluid ejector substrate, where the attachment region includes a first material and the fluid ejector substrate includes a second material. A non-wetting monolayer is formed on the attachment region from a selective precursor, where the selective precursor attaches to the first material and substantially does not attach to the second material.

Particular implementations may include one or more of the following features. The attachment region may surround an orifice in the fluid ejector substrate. The orifice may be formed in the fluid ejector substrate prior to forming the non-wetting monolayer. The selective precursor may include a thiol termination, the first material may include gold, and the second material may include silicon. Forming an attachment region may include sputtering the first material onto the fluid ejector substrate and patterning the first material.

In still another aspect, the invention features a fluid ejector having an inner surface, an outer surface, and an orifice that allows fluid in contact with the inner surface to be ejected. An attachment region covers at least a portion of an outer surface of a fluid ejector and surrounds an orifice in the fluid ejector, and a non-wetting monolayer covers substantially the entire attachment region and covers substantially none of the outer surface of the fluid ejector apart from the attachment region.

Particular implementations may include one or more of the following features. The attachment region may include a first material that is substantially not present in the outer surface of the fluid ejector. A precursor of the non-wetting monolayer may include a thiol termination, the attachment region may include gold atoms, and the outer surface of the fluid ejector may include silicon atoms. The attachment region need not cover any portion of an inner surface of the fluid ejector.

The invention can be implemented to realize one or more of the following advantages.

A non-wetting monolayer can reduce the accumulation of fluid on the outer surface of the fluid ejector. The monolayer can be durable and can be insoluble in most solvents, allowing multiple types of inks to be used with the fluid ejector. Coating material can be saved because of the thinness of the monolayer. Wet processes are not required after etching the fluid ejector, and therefore residue associated with a wet process can be avoided.

If the non-wetting monolayer is removed post-deposition, the coating can be deposited without first protecting or masking regions of a substrate. If the underlying layer is masked before deposition of the coating, then processing steps to remove undesired regions of a non-wetting monolayer can be eliminated. A non-wetting monolayer can be deposited easily and accurately in desired regions on a substrate.

The details of one or more embodiments of the invention are set forth in the accompanying drawings and the description below. Other features, objects, and advantages of the invention will be apparent from the description, drawings, and claims.

DESCRIPTION OF DRAWINGS

FIGS. 1A-1B are cross-sectional views of implementations of an uncoated fluid ejector.

FIG. 1C is a cross-sectional view of an implementation of the fluid ejector from FIG. 1B with a non-wetting coating on an outer surface.

FIG. 2 is a bottom view of the fluid ejector from FIG. 1C.

FIG. 3 is a cross-sectional view of a second implementation of a fluid ejector with a non-wetting coating on an outer surface.

FIG. 4 is a cross-sectional view of a nozzle layer coated with a non-wetting coating.

FIG. 5 is a cross-sectional view of a nozzle layer with protective tape on an outer surface.

FIG. 6 is a cross-sectional view of a nozzle layer.

FIGS. 7A-7D illustrate process steps in one implementation of a method for forming a non-wetting coating on a nozzle layer.

FIGS. 8A-8C illustrate process steps in a second implementation of a method for forming a non-wetting coating on a nozzle layer.

FIGS. 9A-9B illustrate process steps in a third implementation of a method for forming a non-wetting coating on a nozzle layer.

Like reference symbols in the various drawings indicate like elements.

DETAILED DESCRIPTION

FIG. 1A is a cross-sectional view of an uncoated fluid ejector 100 (e.g., an ink-jet printhead nozzle), which can be constructed as described in U.S. patent application Ser. No. 10/913,571, the contents of which are hereby incorporated by reference. The uncoated fluid ejector 100 includes a flow-path module 110 and a nozzle layer 120, both of which can be made of silicon (e.g., single crystal silicon). In one implementation, the uncoated fluid ejector 100 is a single unit, and the flow-path module 110 and the nozzle layer 120 are not separate pieces. The uncoated fluid ejector 100 includes an inner surface 150 and an outer surface 160. A membrane layer 182 is positioned above a pumping chamber 135. An actuator 172 pressurizes fluid (e.g., an ink, for example, a water-based ink) in the pumping chamber 135 and the fluid flows through a descender 130 and is ejected through an orifice 140 in the nozzle layer 120. The actuator 172 can include a piezoelectric layer 176, a lower electrode 178 (e.g., a ground electrode), and an upper electrode 174 (e.g., a drive electrode). The membrane layer 182 and the actuator 172 are not shown in the following figures, but can be present.

As shown in FIG. 1B, the uncoated fluid ejector 100 optionally can include an inorganic layer 165 formed on the nozzle layer 120, in which case the outer surface 160 of the uncoated ejector can be considered the outer surface of the inorganic layer 165. The inorganic layer 165 is a layer of a material, such as $SiO_2$, that promotes adhesion of a non-wetting coating. In one implementation, the inorganic seed layer 165 is a native oxide layer (such a native oxide typically has a thickness of 1 to 3 nm). In another implementation, the inorganic layer is a deposited seed layer. For example, an inorganic seed layer 165 of $SiO_2$ can be formed on the nozzle layer 120, for example, by introducing $SiCl_4$ and water vapor into a chemical vapor deposition (CVD) reactor containing the uncoated fluid ejector 100. A valve between the CVD chamber and a vacuum pump is closed after pumping down the chamber, and vapors of $SiCl_4$ and $H_2O$ are introduced into the chamber. The partial pressure of the $SiCl_4$ can be between 0.05 and 40 Torr (e.g., 0.1 to 5 Torr), and the partial pressure of the $H_2O$ can be between 0.05 and 20 Torr (e.g., 0.2 to 10 Torr). The deposition temperature is typically between room temperature and 100 degrees centigrade. Alternatively, the inorganic seed layer 165 can be sputtered onto the nozzle layer 120. The surface to be coated by the inorganic seed layer 165 can be cleaned (e.g., by applying an oxygen plasma) before forming the inorganic seed layer 165.

The thickness of the seed layer can be, for example, 5 nm to 100 nm. For some fluids to be ejected, the performance can be affected by the thickness of the inorganic layer. For example, for some "difficult" fluids, a thicker layer, e.g., 30 nm or more, such as 40 nm or more, for example 50 nm or more, will provide improved performance. Such "difficult" fluids can include, for example, PEDOT and Light Emitting Polymer.

One implementation of a fabrication process alternates between applying layers of the seed material and forming layers the non-wetting coating. In this case, the individual seed layers can be, for example, 5 to 20 nm thick. The exposed surfaces of the device can be cleaned (e.g., by applying an oxygen plasma) before forming the layer of seed material. Hypothetically, this fabrication process could result in a layer stack with alternating layers of seed material and non-wetting coating. However, without being limited to any particular theory, under some conditions the cleaning process might remove the immediately previously deposited non-wetting coating, such that the resulting device has a single continuous thick seed layer (rather than alternating layers of oxide and non-wetting coating).

Another implementation of the fabrication process simply deposits the entire seed layer in a single continuous step to provide a unitary, monolithic seed layer.

Referring to FIGS. 1B and 1C, a non-wetting coating 170, such as a self-assembled monolayer that includes a single molecular layer, is applied to the outer surface 160 of the uncoated fluid ejector 100 to form a coated fluid ejector 105. The non-wetting coating 170 can be applied using vapor deposition, rather than being brushed, rolled, or spun on. The outer surface of the fluid ejector can be cleaned (e.g., by applying an oxygen plasma) before applying the non-wetting coating 170. In one implementation, the inner surface 150, the descender 130, and the inner surface of orifice 140 are not coated in the final fluid ejector product. The non-wetting coating 170 can be deposited on the outer surface 160 of the uncoated fluid ejector 100, for example, by introducing a precursor and water vapor into the CVD reactor at a low pressure. The partial pressure of the precursor can be between 0.05 and 1 Torr (e.g., 0.1 to 0.5 Torr), and the partial pressure of the $H_2O$ can be between 0.05 and 20 Torr (e.g., 0.1 to 2 Torr). The deposition temperature can be between room temperature and 100 degrees centigrade. The coating process and the formation of the inorganic seed layer 165 can be performed, by way of example, using a Molecular Vapor Deposition (MVD)™ machine from Applied MicroStructures, Inc.

Suitable precursors for the non-wetting coating 170 include, by way of example, precursors containing molecules that include a non-wetting termination and a termination that can attach to a surface of the fluid ejector. For example, precursor molecules that include a carbon chain terminated at one end with a —$CF_3$ group and at a second end with an —$SiCl_3$ group can be used. Specific examples of suitable precursors that attach to silicon surfaces include tridecafluoro-1,1,2,2-tetrahydrooctyltrichlorosilane (FOTS) and 1H,1H,2H,2H-perfluorodecyltrichlorosilane (FDTS). Without being limited by any particular theory, it is believed that when a precursor (such as FOTS or FDTS) whose molecules include an —$SiCl_3$ termination are introduced into the CVD reactor with water vapor, silicon atoms from the —$SiCl_3$ groups bond with oxygen atoms from —OH groups on the inorganic seed layer 165 or on a native oxide of the nozzle layer 120.

In another implementation, the coated fluid ejector 105 does not include the inorganic seed layer 165, and the non-wetting coating 170 is applied directly to the nozzle layer 120. In this case, the outer surface 160 of the uncoated ejector can be considered the outer surface of the nozzle layer 120.

FIG. 2 shows a bottom view of the coated fluid ejector 105. The orifice 140 is shown as a rectangular opening, though other opening geometries may be suitable, such as a circle or a polygon with five or more sides.

As shown in FIG. 3, multiple layers of a non-wetting coating 370 can be applied to the outer surface 360 of a fluid ejector 300. The multiple layers can be applied by repeatedly performing the deposition steps described in the context of FIGS. 1B. In one implementation, fluorocarbon chains of a non-wetting coating are cut to expose silicon atoms or —$CH_2$ groups before depositing a layer of the non-wetting coating 370. Fluorocarbon chains can be cut (etched) by an oxygen plasma treatment. An inductively coupled plasma (ICP) source is used to generate active oxygen radicals, and the radicals etch the fluorocarbon chains of the non-wetting coating. The oxygen can be introduced into a CVD reactor, for example, at a pressure of 0.4 Torr and a with a flow rate of 260 sccm. RF power from the ICP source can be applied at 200 W for 30 seconds.

Referring again to FIGS. 1B and 1C, the non-wetting coating 170 can be deposited on the outer surface 160 of the uncoated fluid ejector before or after the flow-path module 110 and the nozzle layer 120 are joined and before or after the orifice 140 is formed in the nozzle layer 120. When the orifice 140 is formed after depositing the non-wetting coating 170, the non-wetting coating 170 typically should be masked while the orifice 140 is being formed to prevent damage to the non-wetting coating 170. If the non-wetting coating 170 is applied after the orifice 140 is formed, non-wetting coating that is deposited on the inner surface 150 of the coated fluid ejector 105 can be removed while leaving the non-wetting coating deposited on the outer surface 160. The orifice 140 can also be masked during the application of non-wetting coating 170 so that substantially no non-wetting coating is deposited on the inner surface 150.

It can be advantageous to apply the non-wetting coating 170 after forming one or more orifices (e.g., orifice 140) in the nozzle layer 120. FIG. 4 shows a nozzle layer 420 to which a non-wetting coating 470 (e.g., a non-wetting monolayer) has been applied before the nozzle layer 420 was joined to a flow-path module. The non-wetting coating 470 typically coats all exposed surfaces of the nozzle layer 420 when applied using a CVD process. The non-wetting coating 470 coats both an inner surface 450 and an outer surface 460 of the nozzle layer 420. An inorganic layer (e.g., inorganic seed layer 165 in FIG. 1B or native oxide) can be present on nozzle layer 420, but is not shown in FIG. 4 for the sake of clarity.

It can be advantageous for selected regions of the nozzle layer 420 not to be covered with a non-wetting coating. Therefore, non-wetting coating can be removed from the selected regions. For example, the non-wetting coating 470 can be removed from the inner surface 450 of the nozzle layer 420. As shown in FIG. 5, a masking layer 580 (e.g., tape) can be applied over the non-wetting coating 470 on the outer surface 460 of nozzle layer 420, and the masked nozzle layer can be placed on a solid surface, such as a silicon substrate 590. An etchant (e.g., oxygen plasma) can be applied to the inner surface 450 of the nozzle layer 420 to remove the portion of the non-wetting coating 470 on the inner surface 450. As shown in FIG. 6, the silicon substrate 590 and the masking layer 580 can be removed after applying the etchant, leaving the nozzle layer 420 with the non-wetting coating 470 only on the outer surface 460.

Alternatively, light (e.g., ultraviolet (UV), deep UV, or green light from a laser) can be used to remove non-wetting coating from selected regions. For example, referring again to FIG. 4, light can be used to irradiate the inner surface 450 of the nozzle layer 420 to remove the portion of the non-wetting coating 470 on the inner surface 450. The light can be supplied, for example, by laser such as an excimer laser (e.g., an ArF or KrF excimer laser). The nozzle layer 420 can be tilted relative to the source of the light so that the walls of orifice 440 are irradiated.

After removing the non-wetting coating 470 from the inner surface 450, the nozzle layer 420 can be attached to a flow-path module (e.g., flow-path module 110 in FIG. 1A). The methods discussed here can also be used when the non-wetting coating 470 is applied after the nozzle layer 420 is attached to the flow-path module. For example, an etchant can be applied to the inner surface 450 through a descender (e.g., descender 130 in FIG. 1A) in the flow-path module. One method of applying an etchant through the descender is to connect an ozone generator to an inlet port of the assembled fluid ejector and supply ozone (e.g., at a 2% or greater concentration in oxygen gas or in a mixture of oxygen and nitrogen) to the descender and the inner surface 450 through the inlet port. The outer surface 460 can be protected with tape while the ozone is supplied to the descender and the inner surface 450. In addition, the ozone can be heated (e.g., to above 80 degrees centigrade, for example, to 120 degrees centigrade) before being injected into descender. In an alternative implementation, oxygen plasma can be used instead of ozone.

As an alternative to removing non-wetting coating from selected regions, the non-wetting coating can be prevented from forming in the selected regions. For example, the non-wetting coating 470 can be prevented from forming on the inner surface 450 of the nozzle layer 420 during a deposition step. Another alternative is to allow the non-wetting coating to form in the selected regions and deposit a layer of material (e.g., $SiO_2$) on top of the non-wetting coating to make the selected region hydrophilic.

As shown in FIG. 7A, a protective structure 785 can be formed for a region (e.g., orifice 740) on a nozzle layer 720. The protective structure 785 can be formed on a silicon substrate 795, for example, by forming a region of silicon oxide 787 over the protective structure 785 and etching the silicon substrate 795 using inductively-coupled plasma to form raised regions.

As shown in FIG. 7B, the nozzle layer 720 and the protective silicon substrate 795 can be placed in contact or bonded, thereby masking the region, in this case the orifice 740, with the protective structure 785. As shown in FIG. 7C, vapor deposition can be used to apply a non-wetting coating 770 to the areas on the outer surface 760 of the nozzle layer 720 that are not masked by the protective structure 785. FIG. 7D shows the nozzle layer 720 after the silicon substrate 795 has been removed, leaving non-wetting coating 770 on the outer surface 760 of nozzle layer 720 in the regions that were not covered by the protective structure 785.

Certain precursors for non-wetting coatings selectively attach to certain materials, while substantially not attaching to other materials. For example, a thiol-terminated precursor attaches to gold, but substantially does not attach to silicon. A precursor with a selective termination and a non-wetting termination can be used to control the regions in which a non-wetting coating forms on a substrate (e.g., silicon). For example, as shown in FIG. 8A, an oxide layer 810 optionally is patterned on a silicon substrate 820. In FIG. 8B, a material (e.g., gold) to which a selective precursor attaches is sputtered onto the silicon substrate 820 or onto the oxide layer 810, if present, and is patterned (e.g., using photoresist) into an attachment region 830. FIG. 8C shows the silicon substrate 820 after an orifice 840 has been etched (e.g., using inductively-coupled plasma) and a non-wetting coating 870 has been formed using a selective precursor (e.g., a thiol-terminated precursor) that attaches to the attachment region 830, but not to the oxide layer 810 or the silicon substrate 820.

Alternatively, as shown in FIG. 9A, the material to which the selective precursor attaches is sputtered directly onto a silicon substrate 920 and is patterned into an attachment region 930. FIG. 9B shows the silicon substrate 920 after an orifice 940 has been etched and a non-wetting coating 970 has been formed using the selective precursor.

Various methods can be used to mask regions of a nozzle layer where a non-wetting coating is not desired before depositing the non-wetting coating. Masking can also be used to protect regions of a non-wetting coating when portions of the non-wetting coating are removed after deposition. For example, tape, wax, or photoresist can be used as a mask to prevent the non-wetting coating from being deposited in selected regions of the nozzle layer. The tape, wax, or photoresist can be removed after the non-wetting coating has been deposited on the nozzle layer. Likewise, tape, wax, or photoresist can be applied over selected regions of a non-wetting coating to prevent the removal of the non-wetting coating in those regions during processing steps that occur after the deposition of the non-wetting coating.

A selected region of a non-wetting coating can be removed without removing the entire non-wetting coating by laser ablation using a hard mask or using a servo-controlled laser. A selected region of a non-wetting coating can also be removed by etching the non-wetting coating with plasma while protecting, using a mask (e.g., photoresist) for example, the regions of the non-wetting coating that are not to be removed. UV light can also be used to remove selected regions of a non-wetting coating, and regions not to be removed can be protected with a mask (e.g., a metal contact mask).

A number of embodiments of the invention have been described. Nevertheless, it will be understood that various modifications may be made without departing from the spirit and scope of the invention. For example, method steps may be performed in a different order and still produce desirable results. Accordingly, other embodiments are within the scope of the following claims.

The invention claimed is:

1. A method for forming a non wetting layer on a selected portion of a fluid ejector, the method comprising:
    applying a protective structure, comprising a body and projections extending from the body, to an outer surface of a fluid ejector, the fluid ejector including a nozzle defined by an opening in the outer surface and an inner surface extending upstream from the opening, wherein the projections of the protective structure contact the outer surface downstream of the opening and mask a region of the outer surface including the opening;
    forming a non-wetting layer on an unmasked region of the outer surface of the fluid ejector.

2. The method of claim 1, wherein forming the non-wetting layer comprises applying the non-wetting layer from downstream of the opening.

3. The method of claim 1, wherein applying the non-wetting layer comprises dispensing a precursor between the body of the protective structure and the outer surface of the fluid ejector.

4. The method of claim 1, wherein the non-wetting layer is a single molecular layer.

5. The method of claim 1, wherein the protective structure comprises a silicon substrate and masking the region includes bonding the silicon substrate to the fluid ejector.

6. The method of claim 1, further comprising removing the protective structure after forming the non-wetting layer.

7. The method of claim 1, wherein the protective structure contacts a portion of the outer surface surrounding the opening of the nozzle.

8. The method of claim 1, wherein forming the non-wetting layer comprises applying a precursor onto the fluid ejector.

9. The method of claim 8, wherein the precursor includes a thiol termination.

10. The method of claim 8, wherein the precursor comprises tridecafluoro-1,1,2,2-tetrahydrooctyltrichlorosilane or 1H,1H,2H,2H-perfluorodecyltrichlorosilane.

11. The method of claim 8, wherein the precursor is applied using a chemical vapor deposition reactor.

12. The method of claim 1, wherein the non-wetting layer comprises molecules that include at least one atom of each of carbon and fluorine.

13. The method of claim 1, wherein the non-wetting layer comprises fluorocarbon chains.

14. The method of claim 1, wherein forming the non-wetting layer comprises forming a self-assembled non-wetting layer.

15. The method of claim 1, further comprising forming an inorganic seed layer on the fluid ejector before forming the non-wetting layer.

16. The method of claim 1, wherein forming the non-wetting layer comprises repeatedly forming single molecule layers on top of one another.

17. The method of claim 1, wherein the non-wetting layer is formed on substantially all portions of the outer surface apart from a contacting region of the protective structure and the outer surface.

* * * * *